United States Patent [19]

Ahmed

[11] 4,164,687
[45] Aug. 14, 1979

[54] TELEVISION KINESCOPE PROTECTION CIRCUIT

[75] Inventor: Adel A. A. Ahmed, Annandale, N.J.

[73] Assignee: RCA Corporation, New York, N.Y.

[21] Appl. No.: 895,227

[22] Filed: Apr. 10, 1978

[51] Int. Cl.² ............................................. H01J 29/52
[52] U.S. Cl. .................................................... 315/384
[58] Field of Search ............... 315/381, 384, 385, 386, 315/408

[56] References Cited

U.S. PATENT DOCUMENTS

| | | | |
|---|---|---|---|
| 3,090,889 | 5/1963 | Levinson | 315/381 |
| 3,308,333 | 3/1967 | Lent | 315/384 |
| 3,714,498 | 1/1973 | Woodworth | 315/384 |
| 3,725,725 | 4/1973 | Yoshida et al. | 315/384 |
| 4,048,544 | 9/1977 | Haferl | 315/408 |

*Primary Examiner*—Theodore M. Blum
*Attorney, Agent, or Firm*—Eugene M. Whitacre; Paul J. Rasmussen; William H. Meise

[57] ABSTRACT

A television switched synchronous vertical deflection (SSVD) circuit produces vertical deflection current by integration of horizontal retrace pulses. Vertical retrace blanking is provided by a monostable multivibrator triggered from the vertical synchronizing signals, and coupled to the kinescope to provide blanking in its unstable state and to unblank in its stable state. Failure of the horizontal retrace pulse supply to the SSVD circuit causes vertical deflection to cease, resulting in a line across the center of the screen. An inhibiting circuit coupled to the multivibrator feedback loop and to the horizontal retrace pulse supply prevents the multivibrator from assuming its stable state except during the presence of a horizontal retrace pulse.

7 Claims, 10 Drawing Figures

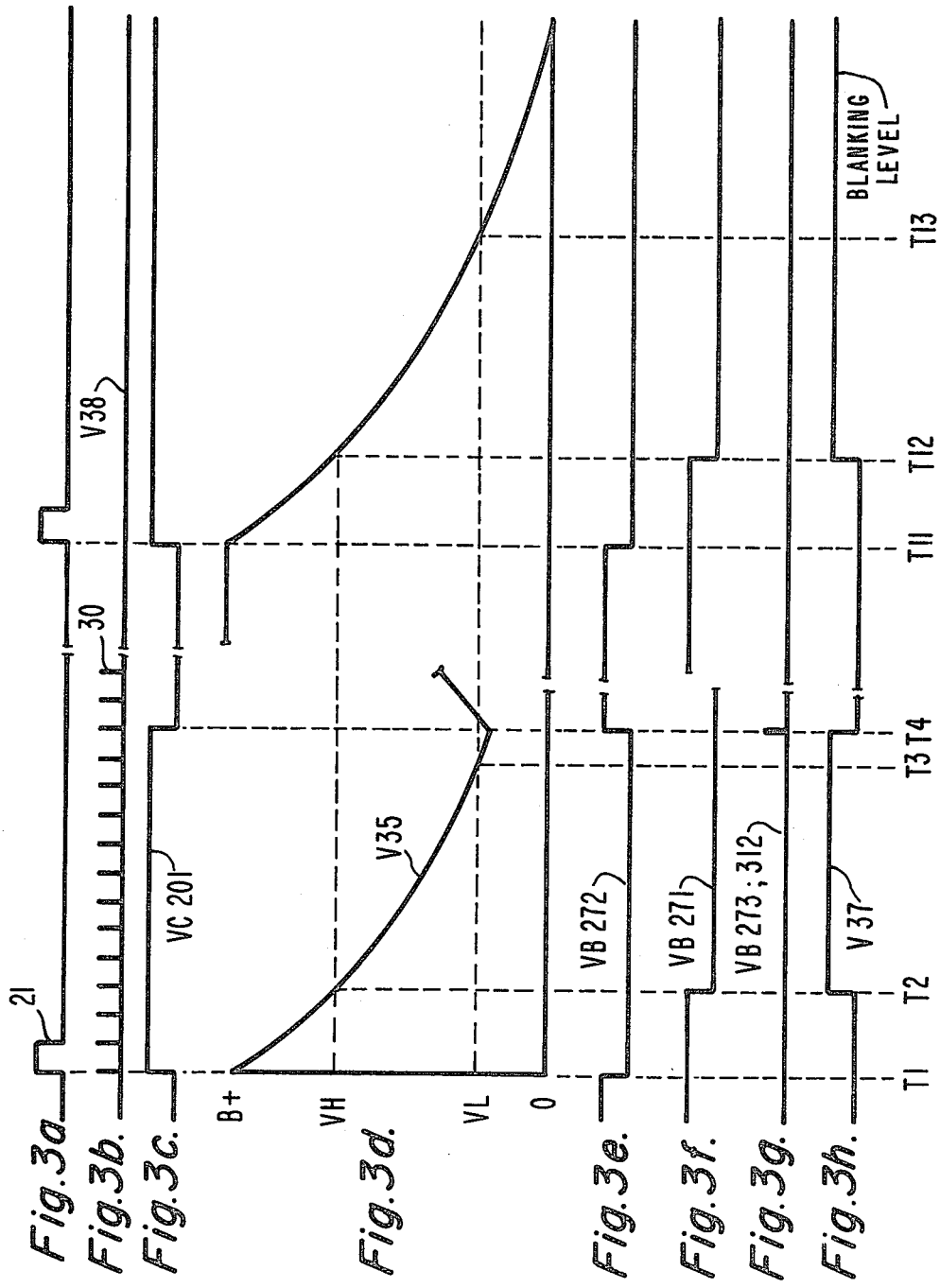

TELEVISION KINESCOPE PROTECTION CIRCUIT

BACKGROUND OF THE INVENTION

This invention relates to television kinescope protection circuits and more particularly to blanking circuits.

Television kinescopes using an electron beam to illuminate a phosphor-coated screen generally have the electron beam scanned over the surface of the screen in horizontal and vertical directions to form an illuminated raster. If the electron beam is not scanned over the entire raster, but is repetitively scanned over only a single horizontal or vertical line, the phosphor may be damaged by the excessive localized power. U.S. Pat. No. 3,146,372 issued on Aug. 25, 1964 in the name of R. B. Fertig describes an arrangement by which the electron-beam deflection signal is rectified to change the bias of the grid to blank the screen when normal scanning raster ceases. This arrangement is relatively slow, because the rectified signal from beam deflecting apparatus must decay significantly before the beam is turned off or blanked.

A faster blanking arrangement is described in U.S. Pat. No. 3,308,333 issued on Mar. 7, 1967 to S. J. Lent. In the Lent arrangement, a monostable multivibrator unblanks the kinescope in its unstable or quasistable condition. The stable condition or state is initiated at the beginning of vertical retrace by application of a vertical synchronizing pulse to the multivibrator, and the unstable state is triggered by the lagging or trailing edge of the vertical flyback or retrace pulse. The unstable period of the multivibrator exceeds the vertical deflection interval. In the event that the vertical deflection fails while the multivibrator is in its stable state, the unstable state is not initiated and the multivibrator remains in its stable blanking condition. If deflection fails when the multivibrator is in its unstable condition, it will return to its stable state after the expiration of the natural period of the unstable condition.

However, it may not always be desired to initiate and terminate kinescope blanking precisely at the beginning and end of the vertical retrace interval. For example, it may be desired to transmit vertical-interval reference signals or digital information in the horizontal lines preceding or following the vertical retrace interval, and blanking of these lines may be desirable. When blanking is not to be initiated and terminated simultaneously with vertical retrace, the Lent protection arrangement may not be satisfactory.

An embodiment of a switched synchronous vertical deflection (SSVD) circuit is described in U.S. Pat. No. 4,048,544 issued on Sept. 13, 1977 in the name of Peter E. Haferl, in which the vertical deflection current is derived by integration of horizontal retrace pulses width-modulated by switches in a feedback manner under control of an analogue of the desired deflection current. If the horizontal retrace pulse drive to the SSVD circuit fails, the vertical deflection will fail though horizontal deflection continues. The SSVD circuit may have an inherent delay between application of the analogue of the deflection current and the resulting deflection current. Copending application Ser. No. 829,539 filed Aug. 31, 1977 in the name of Adel Ahmed describes a blanking pulse generator with delayed transition for use with the SSVD. It is desirable to blank the kinescope upon failure of the horizontal retrace pulse drive to the SSVD. It is further desirable to accomplish this in a manner compatible with the width-modulated control of the SSVD and with provision for kinescope blanking initiation and termination at times other than the leading edge of the vertical synchronizing pulse and lagging edge of the vertical retrace pulse, respectively.

SUMMARY OF THE INVENTION

A kinescope protection circuit for a television deflection apparatus in which vertical deflection power is derived from horizontal deflection signals includes a blanking generator coupled to a source of vertical synchronizing signals and to the kinescope. The blanking generator includes a monostable multivibrator having an input coupled to the source of vertical synchronizing signals for assuming the unstable state at the inception of each synchronizing signal, and an output of the multivibrator coupled to the kinescope for blanking the kinescope during at least a portion of its unstable condition and for unblanking in its stable condition. An inhibiting circuit coupled to the source of horizontal deflection signals and to the multivibrator prevents the multivibrator from assuming its stable state except during the presence of the horizontal deflection pulses.

DESCRIPTION OF THE DRAWING

FIGS. 3a–3h illustrate amplitude-time voltage waveforms occurring in the circuit of FIG. 2 during operation.

DESCRIPTION OF THE INVENTION

Figure 1:
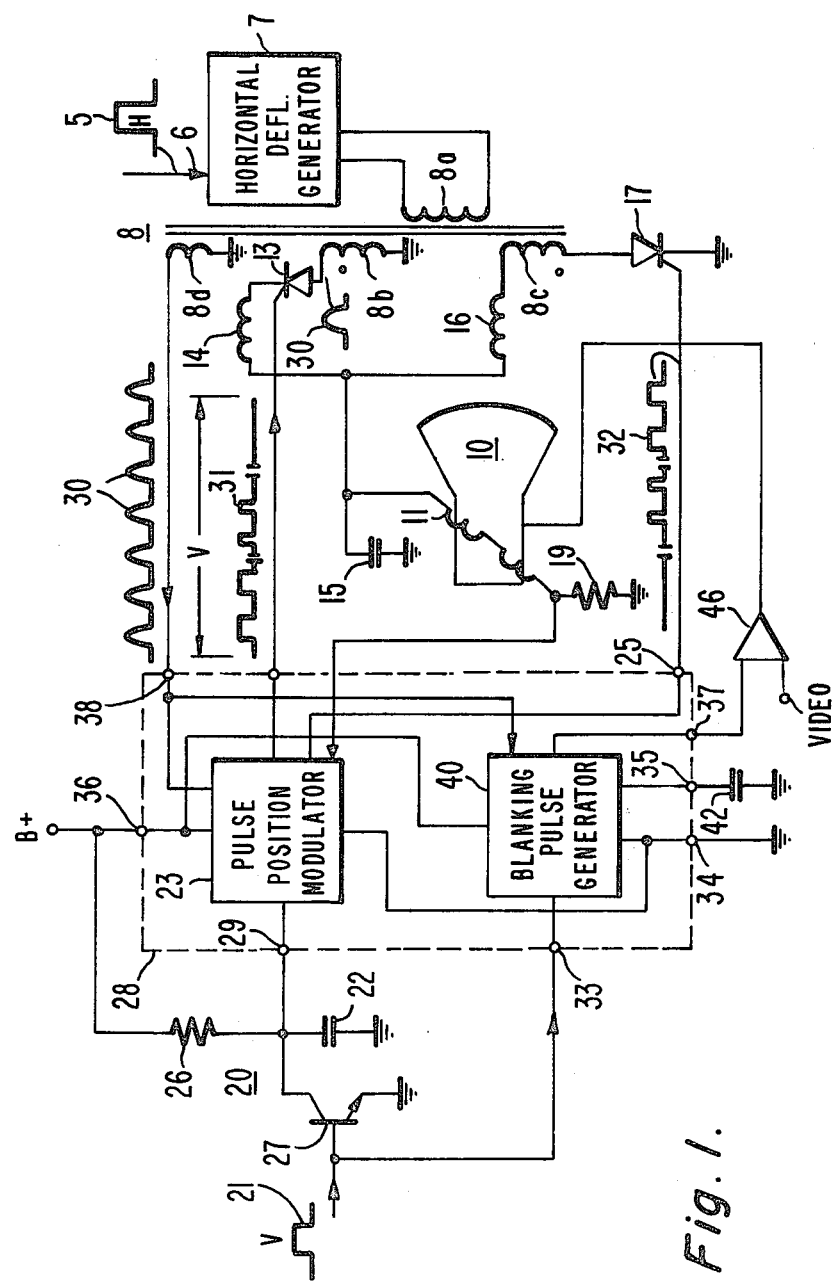
FIG. 1 is a diagram, partially in block and partially in schematic form, of a portion of a television receiver.

FIG. 1 shows, partially in block and partially in schematic form, the deflection and display portion of a television device. At the right of FIG. 1, a horizontal deflection generator 7 is synchronized by horizontal deflection pulses depicted as amplitude-time waveform 5 applied to an input terminal 6 from a synchronizing signal separator, not shown. Horizontal deflection generator 7 drives a horizontal deflection winding, not shown, associated with a kinescope 10. Horizontal deflection generator 7 also drives the primary winding 8a of a transformer 8. A secondary winding 8b of transformer 8, poled as shown, has one end connected to ground. The other end of secondary winding 8b couples recurrent positive-going horizontal retrace voltage pulses depicted as pulse 30 to the anode of a thyristor or SCR 13, the cathode circuit of which includes the serial connection of an inductor 14 and integrating capacitor 15 coupled to ground. The end of a secondary winding 8c of transformer 8 at which a positive-going retrace voltage pulse appears is coupled to ground by the anode-cathode path of an SCR 17. The other end of winding 8c is coupled to capacitor 15 by an inductor 16. Capacitor 15 is coupled in parallel with the series combination of a current sensing feedback resistor 19 and a vertical deflection winding 11 which is disposed about the neck of kinescope 10.

A vertical sawtooth generator 20 at the left of FIG. 1 includes a capacitor 22 and a charging resistor 26 coupled between B+ and ground. A discharge switch transistor 27 has its collector-emitter path coupled across capacitor 22. The base of transistor 27 is driven by vertical synchronizing pulses 21 from the synchronizing signal separator. A recurrent sawtooth voltage having relatively short retrace intervals synchronized with the vertical synchronizing signals appears, as is known, across capacitor 22.

The vertical sawtooth signals appearing across capacitor 22 are coupled by way of an interface terminal 29 to a pulse-position modulator 23 intrinsic to an integrated circuit 28. Pulse-position modulator 23 is coupled by an integrated circuit interface terminal 36 to a source B+ of energizing potential, and by way of a common interface terminal 34 to ground. Modulator 23 produces SCR gating pulses shown as voltage waveforms 31 and 32 at interface terminals 24 and 25, respectively, for application to the gates of SCRs 13 and 17, respectively. A winding 8d of transformer 8 produces horizontal retrace voltage pulses illustrated as waveforms 30 in response to operation of the horizontal deflection generator. Winding 8d is coupled to integrated circuit 28 at an interface terminal 38 for synchronizing the gating pulses produced by modulator 23.

While the operation of the SSVD is described in detail in the aforementioned Haferl patent, a short description of the operation follows. The gating pulses are initiated at times during the horizontal retrace interval which, in the case of top-of-scan SCR gating pulses 31, are progressively delayed with respect to the horizontal retrace pulse and, in the case of bottom-of-scan gating pulses 32, are initiated at times which are progressively advanced with respect to the horizontal retrace pulses. In operation during the first part of the vertical deflection interval, gating pulses 31 enable top-of-scan thyristor 13 for conduction during the initial portions of the horizontal retrace interval. As a result, capacitor 15 charges in a resonant manner through inductor 14. The gating pulses cease before reversal of current in the resonant circuit including capacitor 15 and inductor 14, so that any tendency to reverse the current in thyristor 13 turns it off until the next horizontal retrace interval again coincides with a gating pulse 31. As time progresses during the vertical deflection interval, gating pulses 31 occur later and later with respect to the horizontal retrace pulse, with the result that progressively less charging current flows in capacitor 15. Thus, progressively less horizontal-rate pulse voltage appears across vertical deflection winding 11 for integration into vertical deflection current, and the deflection current decreases.

Near the center of the vertical deflection interval, bottom-of-scan gating pulses 32 begin to occur at times near the end of the horizontal retrace pulses. Thus, bottom-of-scan SCR 17 is enabled for conduction near the end of each horizontal retrace interval, charging capacitor 15 through inductor 16 in a resonant manner with a polarity opposite that of the top-of-scan SCR. The progressively advancing time of initiation of gating pulses 32 during the second half of the vertical deflection interval progressively increases the negative charging current in capacitor 15, which results in an increasing negative horizontal-rate pulse voltage across vertical deflection winding 11, so as to deflect the kinescope beam progressively towards the bottom of the raster.

In addition to other circuits, integrated circuit 28 contains a blanking pulse generator 40 which is triggered by vertical synchronizing pulses 21 applied at an interface terminal 33 and by horizontal retrace pulses 30 applied at interface terminal 38. Blanking pulse generator 40 is energized by B+ and is coupled to common interface terminal 34. Blanking pulse generator 40 produces blanking pulses at a rate controlled by synchronizing pulses 21. The blanking pulses are coupled to the kinescope by an interface terminal 37 and a video amplifier 46. The time at which the transition of the blanking pulses produced by blanking pulse generator 40 takes place is controlled by a time constant circuit represented as a capacitor 42 coupling interface terminal 35 to ground.

Figure 2:
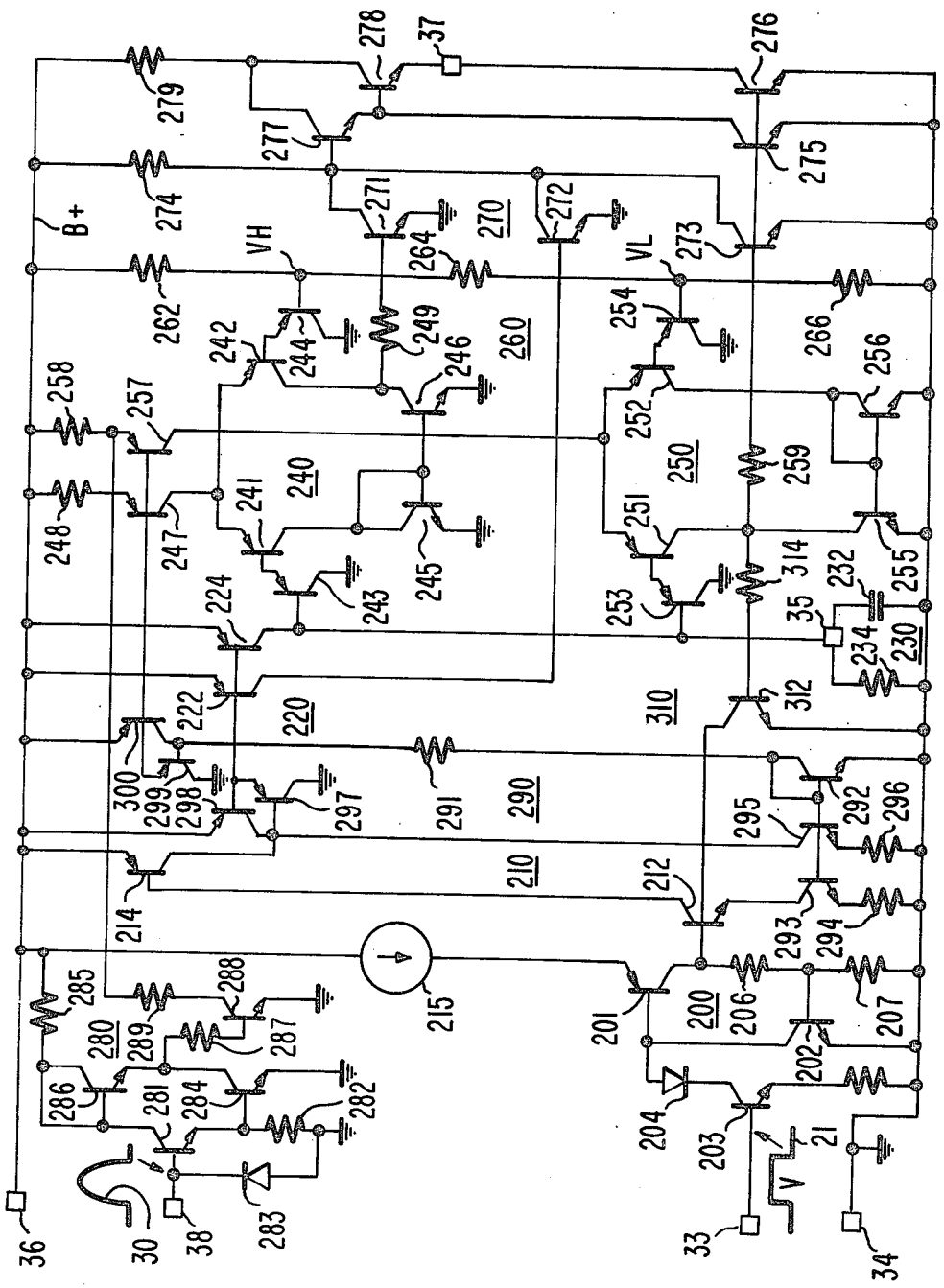
FIG. 2 is a schematic diagram of a blanking circuit embodying the invention which may be used in conjunction with the arrangement of FIG. 1.

FIG. 2 shows in schematic form a blanking pulse generator which may be connected between interface terminals 33 through 38 of FIG. 1 as blanking pulse generator 40. Generally speaking, the arrangement of FIG. 2 shows at the left a vertical synchronizing pulse 21 applied to a latch circuit 200 energized by a constant-current source 215 at left center. The latch circuit energizes a switch 220 at top center of FIG. 2, which charges a time constant circuit designated generally as 230 at bottom center. At right of center, comparators 240 and 250 compare the voltage across the time constant circuit with reference voltages derived from a voltage divider 260. At the right of FIG. 2, a combining circuit designated generally as 270 combines outputs from the comparators and the switch to produce the desired kinescope blanking pulse at interface terminal 37 on the right of the FIGURE. Latch 200, switch 220, time constant circuit 230 and comparator 250 are coupled in a feedback loop to form a monostable multivibrator, i.e., a circuit which may be triggered into an unstable state or condition in which its remains for a predetermined time before returning to the stable state. An inhibiting circuit 280 at top left of FIG. 2 opens the multivibrator feedback loop except during the presence of horizontal retrace drive pulses 30.

Vertical synchronizing pulses 21 are applied to the base of an NPN transistor 203 of latch 200 by way of interface terminal 33. The emitter of transistor 203 is grounded to terminal 34 by means of a resistor, and the cathode of a diode 204 is connected to the collector. The anode of diode 204 is connected to the collector of an NPN transistor 202 and to the base of a PNP transistor 201. The emitter of transistor 202 is grounded and its base is coupled to the collector of transistor 201 in a regenerative manner by a tap on a voltage divider consisting of resistors 206 and 207 connected between the collector of transistor 201 and ground. An output signal is taken from the collector of transistor 201 by a pair of cascaded inverting stages including an NPN transistor 212 and a PNP transistor 214.

Transistors 212 and 214 receive biasing current by way of a constant current source designated generally as 290 and including a current-establishing resistor 291 connected at one end to the anode of a diode-connected NPN transistor 292, the cathode of which is connected to ground. The anode of diode 292 is connected to the base of a current-source NPN transistor 293, the emitter of which is coupled by way of a resistor 294 to ground and the collector of which is connected to the emitter of transistor 212. The anode of diode 292 is also coupled to the base of another current-source NPN transistor 295, the emitter of which is coupled to ground by a resistor 296 and the collector of which is connected to the collector of transistor 214. The end of resistor 291 remote from diode 292 is connected to the collector of a PNP transistor 300, the emitter of which is connected to the B+ bus at interface terminal 36. Transistor 300 is in effect diode-connected by means of an emitter-follower coupled PNP transistor 299 having its base coupled to the collector, and its emitter coupled to the base of transistor 300. The collector of transistor 299 is connected to ground.

The collector-to-emitter path of transistor 214 is coupled in parallel with the collector-to-emitter path of a PNP transistor 298. Transistor 298 is essentially diode-connected by means of a PNP transistor 297 having its collector connected to ground and having its base coupled to the collector, and its emitter coupled to the base of transistor 298, respectively. The base of transistor 298 is connected to the bases of PNP switch transistors 222 and 224 of switch 220. The collector of transistor 222 is connected to the base of an NPN switch transistor 272, the emitter of which is connected to ground and the collector of which is coupled by way of a load resistor 274 to B+. Switching transistor 224 has its emitter connected to B+ and its collector connected by way of an interface terminal 35 with time constant circuit 230, which includes a capacitor 232 coupled between terminals 34 and 35 and a resistor 234 coupled in parallel with the capacitor.

A first comparator circuit 240 includes emitter-coupled PNP transistors 241 and 242, the emitters of which are supplied with a constant current from the collector of a PNP transistor 247, the base of which is connected to the base of transistor 300 and the emitter of which is coupled to B+ by a resistor 248. The base of transistor 241 is coupled to interface terminal 35 by an emitter-follower coupled PNP transistor 243. The base of transistor 242 is coupled to an emitter-follower connected PNP transistor 244, the collector of which is connected to ground. The base of transistor 244 is connected to a tap VH of a voltage divider designated generally as 260, and including resistors 262, 264 and 266 connected between B+ and ground. The collector of transistor 241 is coupled to the collector of transistor 242 by a current mirror amplifier (CMA) including a diode-connected NPN transistor 245 coupled across the base-emitter junction of an NPN transistor 246, the emitter of which is coupled to ground. An output of comparator 240 is taken from the collector of transistor 242.

A second comparator 250 includes PNP transistors 251 and 252 coupled at their emitters and supplied with current from the collector of a PNP transistor 257, the base of which is connected to the base of transistor 300 and the emitter of which is coupled to B+ by means of a resistor 258. As in the case of comparator 240, emitter-follower connected PNP transistors 253 and 254 couple the bases of transistors 251 and 252, respectively, to interface terminal 35 and to a point VL on voltage divider 260. The collector of transistor 252 is coupled to the collector of transistor 251 by a CMA including diode 256 and transistor 255. The collector of transistor 251 serves as the output terminal of comparator 250.

Outputs are taken from comparators 240 and 250 to summing circuit 270 by means of resistors 249 and 259, respectively. Resistor 249 is connected to the base of an NPN transistor 271, the emitter of which is connected to ground and the collector of which is connected to the collector of transistor 272. Similarly, resistor 259 is coupled to the base of an NPN transistor 273, the emitter of which is grounded and the collector of which is connected to the collector of transistor 272. Resistor 259 is also connected to the bases of pull-down NPN transistors 275 and 276, the emitters of which are grounded.

A noninverting output amplifier including NPN transistors 277 and 278 couples the sum signal representing the blanking signal at the collector of transistor 272 to output interface terminal 37. The base of transistor 277 is connected to the collector of transistor 272 and its emitter is connected to the collector of transistor 275. The base of transistor 278 is connected to the emitter of transistor 277 and its emitter is coupled to the collector of transistor 276 and to terminal 37. The collectors of transistors 277 and 278 are joined and coupled to B+ by a resistor 279.

Latch 200, switch 220, time constant circuit 230 and comparator 250 are coupled in a feedback loop to form a monostable multivibrator by an unlatching circuit designated generally as 310 and including an NPN transistor 312 having its base coupled to the output terminal of comparator 250 by means of a resistor 314, its collector connected to the collector of transistor 201 and its emitter connected to ground. The described closed multivibrator feedback loop may be selectively opened under the influence of disabling circuit 280. Circuit 280 includes an NPN transistor 281 having its base coupled to interface terminal 38 and its emitter coupled to ground by a resistor 282. The base of transistor 281 is coupled to ground by the cathode-anode path of a protective diode 283. The emitter of transistor 281 is connected to the base of an NPN transistor 284, the emitter of which is connected to ground. The collector of transistor 281 is coupled to B+ by means of a resistor 285 and to the anode of a diode-connected transistor 286, the cathode of which is connected to the collector of transistor 284. The collector of transistor 284 is coupled by a resistor 287 to the base of an NPN transistor 288, the emitter of which is connected to ground and the collector of which is coupled by means of a resistor 289 to the emitter of transistor 257.

The general operation of the blanking pulse generator with delayed transition depicted in FIG. 2 is described in the aforementioned copending Ahmed application. However, a short description of the operation follows. Initially, the multivibrator is in its stable condition, latch 200 is nonconductive and switch 220 is conductive, maintaining interface terminal 35 at substantially B+, capacitor 232 charged and transistor 272 conductive to maintain the output at terminal 37 in the low or unblanked condition. Comparator 240 produces a high output, maintaining transistor 271 conductive, and comparator 250 produces a low output which maintains transistors 273–276 and 312 nonconductive.

A vertical synchronizing signal 21 is applied at a time T1 to terminal 33 as illustrated in FIG. 3a, to set the multivibrator to its unstable condition. At time T1, latch 200 conducts as indicated by the collector voltage VC201 of transistor 201 illustrated in FIG. 3c, and turns on transistors 212 and 214, thereby shunting base current away from transistors 222 and 224, which become nonconductive. Nonconduction of transistor 222 renders transistor 272 nonconductive by removing base drive VB272, as shown in FIG. 3e at time T1, but the output blanking signal V37 illustrated in FIG. 3h remains low because of conduction of transistor 271. Capacitor 232 begins to discharge through resistor 234 as illustrated by V35 of FIG. 3d. After a predetermined time established by the time constant of circuit 230, the voltage at terminal 35 and the base of transistor 243 will decrease at a time T2 to the voltage at tap VH, and the output of comparator 240 will go low, turning off transistor 271, as illustrated by its base voltage VB271 in FIG. 3f. This allows a high blanking voltage V37 to appear at terminal 37 as illustrated by V37 of FIG. 3h. The high blanking voltage is maintained after time T2 as capacitor 232 discharges, until the voltage at terminal 35 decreases to VL at time T3.

In the absence of a horizontal synchronizing pulse applied at input terminal 38, transistors 281 and 284 are nonconductive, and base drive is supplied to transistor 288 by the path including diode 286 and resistors 285 and 287. With transistor 288 conductive, the emitter of transistor 257 is made more negative than its base, and transistor 257 cannot conduct to supply operating current to comparator 250. In the presence of a horizontal pulse at terminal 38, transistors 281 and 284 are conductive, thereby removing base drive from transistor 288, rendering it nonconductive, thereby allowing transistor 257 to be forward biased and to supply operating current to comparator 250. Thus, comparator 250 is disabled and its output is maintained low except during the presence of a horizontal pulse at terminal 38.

If a horizontal drive pulse 30 as illustrated in FIG. 3b does not coincide with time T3, comparator 250 remains nonconductive and does not produce a signal at the bases of transistors 273 and 312, as illustrated by the base voltage VB273, VB312 of FIG. 3g. The voltage across capacitor 232 continues to decrease after time T3 as illustrated in FIG. 3d until the next following horizontal drive pulse, which occurs at time T4.

At time T4, comparator 250 is enabled for conduction and V35 is lower than VL, so the output of comparator 250 goes high as indicated by VB273. A high output from comparator 250 at time T4 renders transistor 273 conductive and terminates blanking by once again making the output at terminal 37 low. Also at time T4, the high output from comparator 250 turns on transistor 312 as illustrated by VB312 of FIG. 3g. Conduction of transistor 312 shorts the collector of transistor 201 to ground, which deprives transistor 202 of base drive and unlatches circuit 200, restoring the multivibrator to its stable condition.

With circuit 200 unlatched, switch 220 once again becomes conductive, turning on transistor 272 to maintain the output blanking voltage low while capacitor 232 is charged towards B+ in readiness for application of another input synchronizing signal.

The described normal operation of the kinescope blanking circuit of FIG. 2 allows vertical blanking to be terminated during the occurrence of horizontal drive pulses having a duration of approximately 10 microseconds and recurring at 63 microsecond intervals. Since the vertical blanking interval has a duration on the order of 1000 microseconds, the requirement that it terminate during the horizontal pulse has only a small effect on duration.

Under abnormal conditions, as where horizontal drive pulses are absent as illustrated in the vicinity of times T11–T13 in FIG. 3b, pulse 21 switches latch 200 as illustrated by VC201, and the voltage V35 across capacitor 232 decreases, passing through times T12 and T13 as was the case in normal operation. However, in the absence of horizontal pulses 30, comparator 250 will not be enabled after time T13, unlatching transistor 312 will not receive an input and latch 200 will therefore remain in its set condition as illustrated by VC201 in FIG. 3c. With latch 200 set, switch 220 remains nonconductive, with the result that transistors 271–273 remain nonconductive and the output blanking signal at terminal 37 remains high, blanking the kinescope and protecting the kinescope phosphor against damage.

The described arrangement allows kinescope blanking beginning at a predetermined time after a vertical synchronizing signal and terminating during the first horizontal pulse following a second predetermined interval from the synchronizing signal. In the event of failure of the horizontal pulses, the kinescope will be blanked during the next following vertical blanking interval and will remain blanked until restoration of the horizontal pulses.

Other embodiments of the invention will be apparent to those skilled in the art. For example, the vertical and horizontal triggering signals may be derived from any of the numerous locations in which they appear in a television apparatus. The initial delay of blanking provided by comparator 240 may be set to zero. The multivibrator feedback loop may be opened at any convenient point by a switch which is either normally closed or normally open, depending on the required connections. Also, the blanking signal may be of a polarity and magnitude convenient to the point in the video chain at which it is applied. The reference voltage against which the decreasing voltage of capacitor 232 is compared may be intrinsic to the comparator, as by comparison with a base-emitter offset voltage. The capacitor may be discharged at a constant rate to form a linear ramp signal rather than an exponential, and may be charged rather than discharged.

What is claimed is:

1. A kinescope protection circuit for a television deflection apparatus in which vertical deflection power is derived from horizontal deflection signals by integration, comprising:

blanking generator means coupled to a source of vertical synchronizing signals and to said kinescope, said blanking generator means including a monostable multivibrator having its input coupled to said source of vertical synchronizing signals for assuming the unstable state at the inception of each of said synchronizing signals, the output of said multivibrator being coupled to said kinescope for blanking during at least a portion of its unstable condition and for unblanking during its stable condition; and inhibiting means coupled to said source of horizontal deflection signals and to said multivibrator means for preventing said multivibrator from assuming its stable state except during the presence of said deflection signals.

2. A protection circuit according to claim 1 wherein said inhibiting means comprises means for opening the feedback loop of said monostable multivibrator.

3. A protection circuit according to claim 1 wherein said monostable multivibrator comprises:

time constant means for establishing a ramp signal during said unstable condition;

comparator means coupled to said time constant means for performing a comparison of said ramp signal with a reference to determine said unstable period; and wherein said inhibiting means is coupled with said comparator means for inhibiting its operation except during the presence of said deflection pulses.

4. A protection circuit according to claim 3 wherein said comparator means comprises emitter-coupled differential amplifier means;

a current source coupled to said emitter-coupled differential amplifier for supplying energizing current thereto; and wherein said inhibiting means is coupled with said current source for disabling said current source and said emitter-coupled differential amplifier except during the presence of said deflection pulses.

5. A protection circuit according to claim 4 wherein said current source comprises:
a bipolar transistor including emitter, base and collector electrodes; said collector electrode being coupled to said emitter-coupled differential amplifier for supplying energizing current thereto;
resistance means coupled in a circuit including said emitter electrode of said bipolar transistor;
a bias voltage source coupled with said base electrode of said bipolar transistor; and
wherein said inhibiting means comprises switch means coupled with said emitter electrode of said bipolar transistor for reverse-biasing said base relative to said emitter of said bipolar transistor except during said deflection pulses.

6. A protection circuit according to claim 5 wherein said horizontal deflection signals comprise recurrent trace and retrace portions;
said vertical deflection power is derived from said retrace portions of said horizontal deflection signals; and said switch means is rendered conductive during said retrace portions of said horizontal deflection signals.

7. A kinescope deflection circuit including a source of kinescope horizontal deflection rate signals, a source of kinescope vertical deflection synchronizing signals; and a blanking signal generator coupled with said kinescope for applying a beam blanking signal thereto, said blanking signal generator further comprising:
a bistable circuit including a reset input and a set input coupled to said source of vertical synchronizing signals, for being set to a first of two stable states upon the occurrence of a vertical synchronizing signal and for producing a set signal at an output thereof when in said set state;
time constant means having an input and an output, said time constant means initiating a ramp signal at said output when said input of said time constant means is coupled to said output of said bistable circuit and said set signal appears at said output of said bistable circuit;
comparator means including an input terminal and an output terminal for forming a switching signal at said output terminal when said input terminal is coupled to said time constant means and said ramp signal exceeds a particular value;
coupling means coupled to said reset input and output of said bistable circuit, said time constant means, said comparator means and said source of horizontal rate signals for coupling said bistable circuit, said time constant means and said comparator means in a regenerative feedback loop during said horizontal rate signals; and
means coupling said kinescope with a point on said regenerative loop for switching said blanking signal upon occurrence of said switching signal.

* * * * *